(12) United States Patent
Guo et al.

(10) Patent No.: US 8,213,106 B1
(45) Date of Patent: Jul. 3, 2012

(54) ZONED SERVO SYSTEM

(75) Inventors: Guoxiao Guo, Foothill Ranch, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 234 days.

(21) Appl. No.: 12/401,494

(22) Filed: Mar. 10, 2009

(51) Int. Cl.
*G11B 5/596* (2006.01)
*G11B 5/02* (2006.01)

(52) U.S. Cl. .................. 360/77.08; 360/29
(58) Field of Classification Search .......... None
See application file for complete search history.

(56) References Cited

U.S. PATENT DOCUMENTS

| | | | |
|---|---|---|---|
| 5,208,556 A * | 5/1993 | Wilson ............ 331/1 A |
| 5,418,659 A | 5/1995 | Shergill |
| 5,739,994 A | 4/1998 | Ottesen et al. |
| 5,796,535 A | 8/1998 | Tuttle et al. |
| 5,861,766 A | 1/1999 | Baumer et al. |
| 5,956,196 A | 9/1999 | Hull et al. |
| 6,028,727 A * | 2/2000 | Vishakhadatta et al. ....... 360/51 |
| 6,084,738 A | 7/2000 | Duffy |
| 6,118,604 A | 9/2000 | Duffy |
| 6,178,056 B1 | 1/2001 | Cloke et al. |
| 6,262,857 B1 | 7/2001 | Hull et al. |
| 6,388,829 B1 | 5/2002 | Nazarian |
| 6,411,452 B1 | 6/2002 | Cloke |
| 6,441,981 B1 | 8/2002 | Cloke et al. |
| 6,519,104 B1 * | 2/2003 | Cloke et al. ............ 360/51 |
| 6,628,171 B1 * | 9/2003 | Chou et al. ............ 331/1 A |
| 6,992,856 B2 | 1/2006 | Ehrlich |
| 7,012,773 B2 | 3/2006 | Ashikaga et al. |
| 7,075,742 B2 | 7/2006 | Ehrlich |
| 7,092,177 B2 | 8/2006 | Ehrlich |
| 7,715,138 B1 * | 5/2010 | Kupferman ............ 360/51 |
| 7,729,074 B2 * | 6/2010 | Venkataramani et al. ...... 360/51 |
| 7,813,065 B2 * | 10/2010 | Annampedu et al. ......... 360/29 |
| 8,022,774 B2 * | 9/2011 | Ueno et al. ............ 331/17 |
| 2007/0064325 A1 | 3/2007 | Bi et al. |

* cited by examiner

*Primary Examiner* — K. Wong

(57) ABSTRACT

A disk drive includes a plurality of servo zones of different servo frequencies and a read channel. The disk drive also includes a frequency detector operable to determine a servo frequency associated with a servo sector. The read channel includes a voltage-controlled oscillator operable to provide a reference clock; frequency multiplier/divider circuitry operable to multiply or divide the reference clock from the voltage-controlled oscillator by a first factor to generate a first servo timing recovery clock for the first servo zone, the first factor selected based at least in part on the servo frequency determined by the frequency detector; and a servo demodulator operable to demodulate the at least a portion of a servo sector using the first servo timing recovery clock.

33 Claims, 12 Drawing Sheets

ZONED SERVO SYSTEM

BACKGROUND

Magnetic disk drives are conventionally designed to store large volumes of data on a plurality of disks mounted on a spindle assembly. Typically, each disk includes two disk surfaces capable of storing data. On each disk surface, user data is divided into groups of sectors and stored in concentric circular tracks located between an outside diameter and an inside diameter of the disk. Embedded servo information is recorded in servo sectors located in radially continuous narrow wedges along the disk surface.

In order to maximize the data recorded on each disk surface, it is often desirable to use zone banding for both data and servo sectors. In zone banding, the rate or frequency at which data/servo information is recorded to a disk surface increases from the inner tracks to the outer tracks to compensate for the fact that tracks toward the inside diameter of the disk surface are shorter and can hold less data/servo information than tracks near the outside diameter. Thus, using zone banding, relatively uniform data and servo densities may be achieved over the entire disk surface.

Although frequencies could theoretically be optimized for each track, zone banding techniques typically utilize a relatively low number of discrete data and servo frequencies. Accordingly, groups of adjacent tracks may be assigned to an array of zones between the innermost and the outermost track of a disk surface. For example, there may be between five and 20 data zones across a disk surface, and between three and ten servo zones across the disk surface. Data may be written at the same recording frequency within each data zone, and the recording frequency may increase from the inner data zones to the outer data zones. Similarly, servo sectors may be recorded at the same servo frequency within each servo zone, and the servo frequency may increase from the inner servo zones to the outer servo zones.

Unfortunately, disk drive performance may be adversely impacted when crossing servo zone boundaries. For example, a conventional disk drive generates a number of system clocks based on the current servo frequency and may require a particular set of filtering and demodulation parameters when reading servo information at the current servo frequency. When the disk drive begins reading from a new servo zone, these system clocks and filtering and demodulation parameters will be at least momentarily out of synchronization with the new servo frequency. Typically, the process of synchronization with the new servo zone takes a relatively long time (e.g., >3 servo wedges), during which the disk drive is unable to optimally seek, track follow, or read/write data.

There is therefore a need in the art to improve the implementation of zoned servo in disk drives.

DETAILED DESCRIPTION

Figure 1:
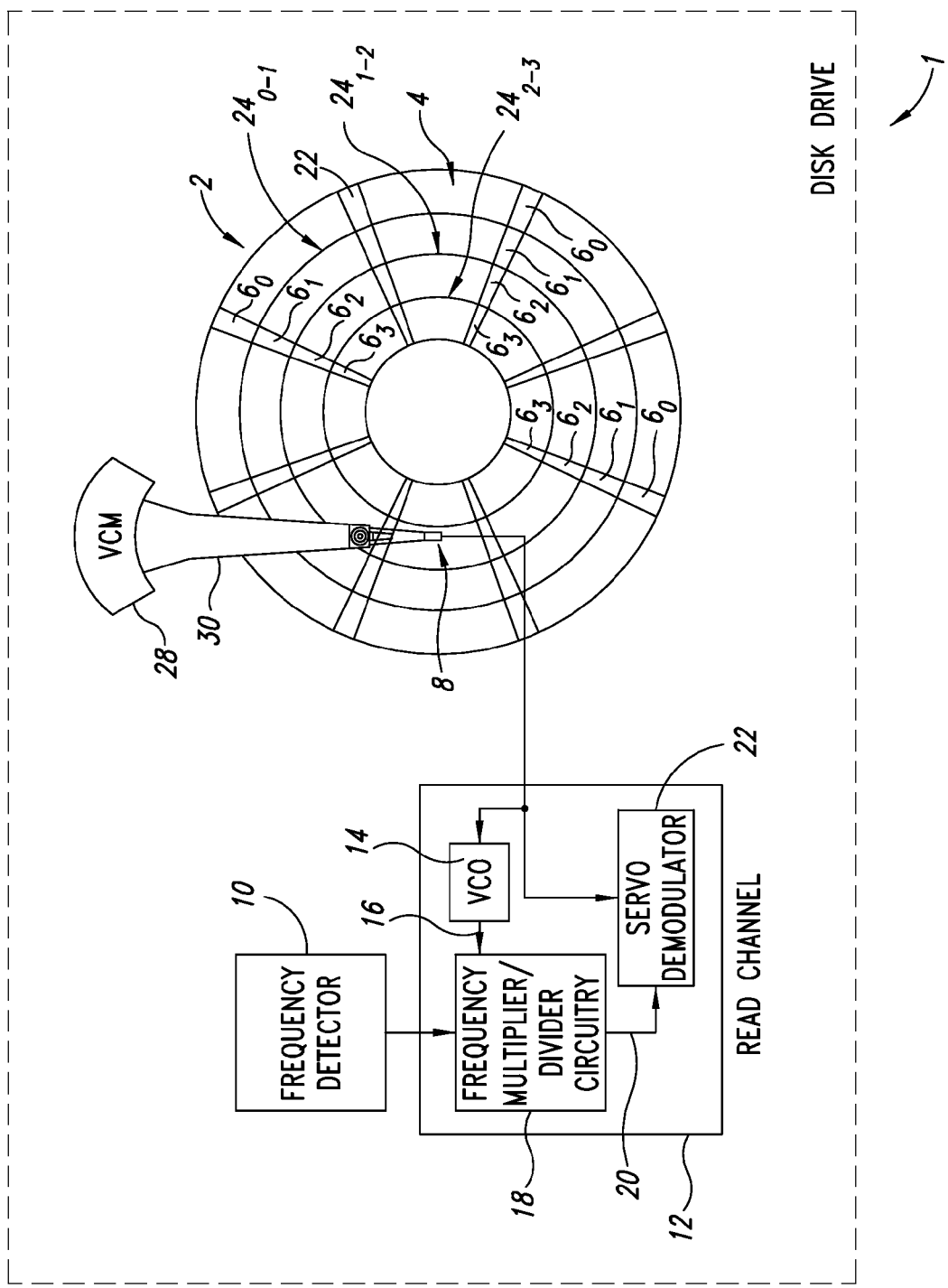
FIG. 1 is a schematic view generally illustrating an example disk drive, according to one illustrated embodiment.

Referring to FIG. 1, according to one embodiment, disk drive 1 comprises a disk 2 having a disk surface 4 including a plurality of servo zones $6_{0-3}$ (delineated by the concentric circles of FIG. 1) of different servo frequencies, and a head 8 actuatable over the disk surface 4, the head 8 operable to generate a signal indicative of at least a portion of a servo sector in a first servo zone (e.g., first servo zone $6_2$, although the head 8 may be operable to generate a signal indicative of any of the servo zones 6). The disk drive 1 may further include a frequency detector 10 operable to determine a servo frequency associated with the servo sector, and a read channel 12 coupled to the head 8. In one embodiment, the read channel 12 further includes a voltage-controlled oscillator ("VCO") 14 operable to provide a reference clock 16, frequency multiplier/divider circuitry 18 operable to multiply or divide the reference clock 16 from the VCO 14 by a first factor to generate a first servo timing recovery clock 20 for the first servo zone $6_2$, the first factor based at least in part on the servo frequency determined by the frequency detector 10, and a servo demodulator 22 operable to demodulate the at least a portion of the servo sector using the first servo timing recovery clock 20.

As illustrated herein, the disk drive 1 comprises a magnetic disk drive, and the methods described herein will be described in terms of such a disk drive. However, the methods, circuitry and devices described herein may also be applied to and/or implemented in other disk drives, including, e.g., optical and magneto-optical disk drives.

The disk 2 may comprise any of a variety of magnetic or optical disk media. In one embodiment, the disk 2 comprises conventional magnetic media having tracks defined in a servo writing process. In another embodiment, the disk 2 may comprise discrete track recording ("DTR") media, having a plurality of concentric micro-grooves defined therein. As illustrated, the disk 2 includes a disk surface 4, as well as an opposite disk surface not visible in FIG. 1. In one embodiment, the disk surface 4 comprises a plurality of generally concentric tracks defined at least in part by a plurality of servo sectors. These tracks may comprise data tracks for receiving and storing user data from a host computer in data sectors. In other embodiments, more disks may, of course, be included in the disk drive 1, and different disk surfaces of these disks may be used for data storage.

The disk surface 4 may further include a plurality of servo zones $6_{0\text{-}3}$ (collectively, 6) associated with different servo frequencies. These servo zones 6 may be better understood with reference to FIG. 3, where the servo zones 6 have been enlarged to illustrate conceptually the different servo frequencies between the outside diameter of the disk 2 and the inside diameter. As illustrated, the servo frequencies generally increase from the inner diameter of the disk 2 to the outer diameter of the disk 2. Thus, since the linear velocity of the disk 2 relative to the head 8 also increases towards the outer diameter of the disk 2, each of the servo zones $6_{0\text{-}3}$ may have roughly equivalent areal densities. As illustrated, the servo zones $6_{0\text{-}3}$ may be separated by logical servo zone boundaries $24_{0\text{-}1}$, $24_{1\text{-}2}$, and $24_{2\text{-}3}$ (collectively, 24). Although these servo zone boundaries 24 are illustrated as visible lines in FIGS. 1 and 3, there may, in fact, be no visible manifestation of these boundaries 24. In some embodiments, the servo zone boundaries 24 may be aligned with corresponding data zone boundaries in a disk drive having a zoned data format. However, in other embodiments, the disk drive 1 may not include data zones. In still other embodiments, the servo zone boundaries 24 need not be aligned with data zone boundaries, and/or there may be more or less servo zones 6 than data zones.

Figure 3:
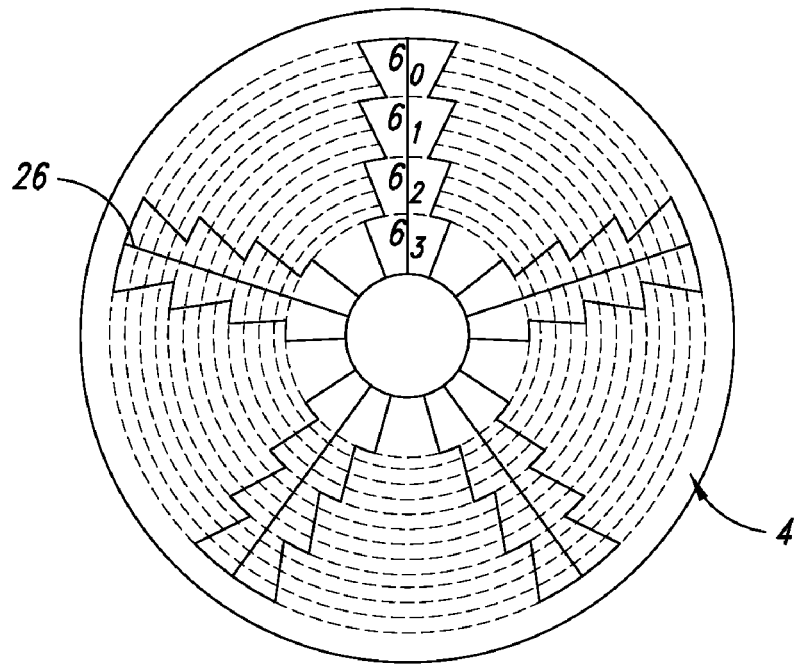
FIG. 3 is a schematic view illustrating an example disk for use in the disk drive of FIG. 1, according to one illustrated embodiment.

In FIGS. 1 and 3, four servo zones $6_{0\text{-}3}$ are illustrated. However, in other embodiments, it may be understood that the disk surface 4 may be divided into any number of servo zones. As the number of servo zones increases, format efficiency increases, but there is increasing complexity associated with the greater number of servo zones. In one embodiment, between two and ten servo zones may be created on each disk surface 4. In other embodiments, more than ten servo zones may be used.

In different embodiments, each servo zone 6 may be associated with any of a variety of servo frequencies. In one embodiment, the servo frequencies of the servo zones 6 may be chosen to satisfy the following equation:

$$f_{svo,i} = (L_i/K) f_{svo,0}$$ Equation 1

In this equation, $f_{svo,0}$ represents the servo frequency of the outermost servo zone $6_0$, and $f_{svo,i}$ represents the servo frequency of a corresponding servo zone $6_i$. $L_i$ is an integer that changes for each servo zone $6_i$, while K is kept constant. In one embodiment, for example, the disk surface 4 may include four servo zones $6_{0\text{-}3}$, and the ratios between the servo frequencies of each of the servo zones $6_{0\text{-}3}$ and the servo frequency of the outermost servo zone $6_0$ may be equal to 4/4, 3/4, 2/4 and 1/4, respectively. In this embodiment, it may be understood that $L_i$ varies between 1 and 4, while the constant K is 4. In another embodiment, the disk surface may include six servo zones. The servo frequencies may then be chosen such that the ratios between the servo frequencies of each of the servo zones and the servo frequency of the outermost servo zone are 16/16, 15/16, 12/16, 10/16, 8/16 and 6/16, from the outermost to the innermost servo zone, respectively. In one embodiment, the servo frequency for the innermost zone may be selected to be less than or equal to 50% of the servo frequency for the outermost zone. In another embodiment, the servo frequency for the innermost zone may be selected to be less than or equal to 37.5% of the servo frequency for the outermost zone. In still another embodiment, the servo frequencies of the servo zones may be selected such that each zone varies from the two adjacent servo zones by at least 10% of that servo zone's frequency. In yet another embodiment, the servo frequencies of the servo zones may be selected such that each zone varies from the two adjacent servo zones by at least 25% of that servo zone's frequency. In other embodiments, different servo frequencies and different numbers of servo zones may be used.

As described above, in one embodiment, each track on the disk surface 4 is defined by a plurality of servo sectors, and that plurality of servo sectors is associated with one of the servo zones 6. Each servo sector may comprise a plurality of different servo fields, in order to facilitate, for example, seek operations and track following. One or more fields of the servo sectors in each servo zone 6 may be recorded at the servo frequency associated with that servo zone 6.

Figure 4A:
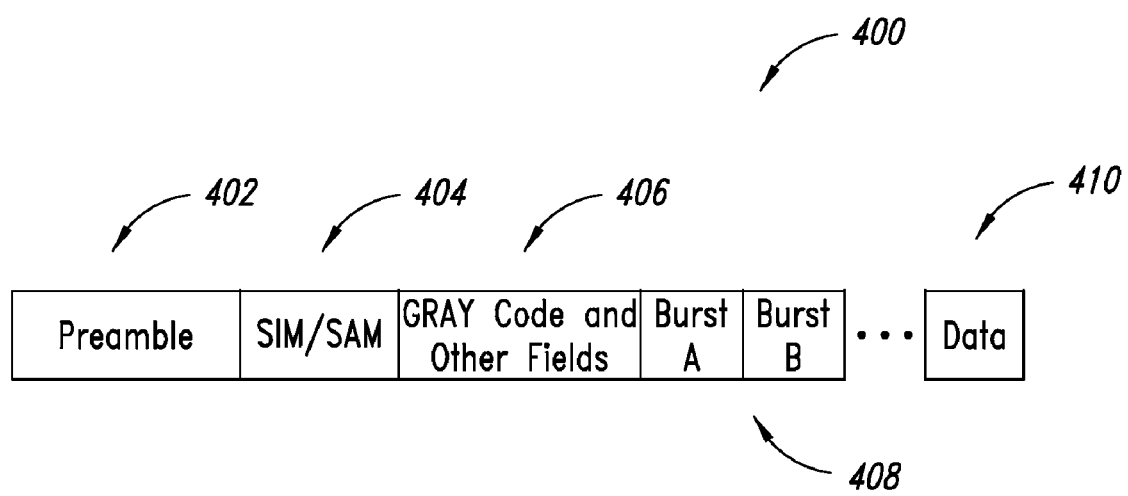
FIG. 4A is a schematic view of servo fields in an example servo sector, according to one illustrated embodiment.

In one embodiment, as illustrated in FIG. 4A, a servo sector 400 comprises a preamble 402, a servo index mark/servo address mark ("SIM/SAM") 404, gray code and other servo fields 406, and servo bursts 408. The servo sector 400 may be positioned adjacent user data 410. The preamble 402 may comprise a sequence of bits recorded at a constant frequency, and might include a sufficient number of consecutive flux reversals to enable circuitry in the read channel 12 to achieve phase synchronization with the preamble 402. In one embodiment, the preamble 402 is recorded at the servo frequency associated with one of the servo zones 6. The SIM/SAM 404 may be used to synchronize servo sector timers for the subsequent detection of a servo sync mark ("SSM"), which may form part of the gray code and other servo fields 406. In one embodiment, the SIM/SAM 404 violates RLL code constraints, so that it is easily distinguished from all other information, and may be recorded at a frequency other than the servo frequency. The gray code and other servo fields 406 might include a variety of servo information, including: a cylinder address/track identifier, a servo sector address, the SSM and cyclical redundancy check codes. One or more of these servo fields may be recorded redundantly in the servo sector 400. In one embodiment, the gray code and other servo fields 406 may be recorded at the servo frequency associated with one of the servo zones 6. The servo bursts 408 may facilitate track following operations and enable the head 8 to closely track a hypothetical data track centerline.

Figure 2:
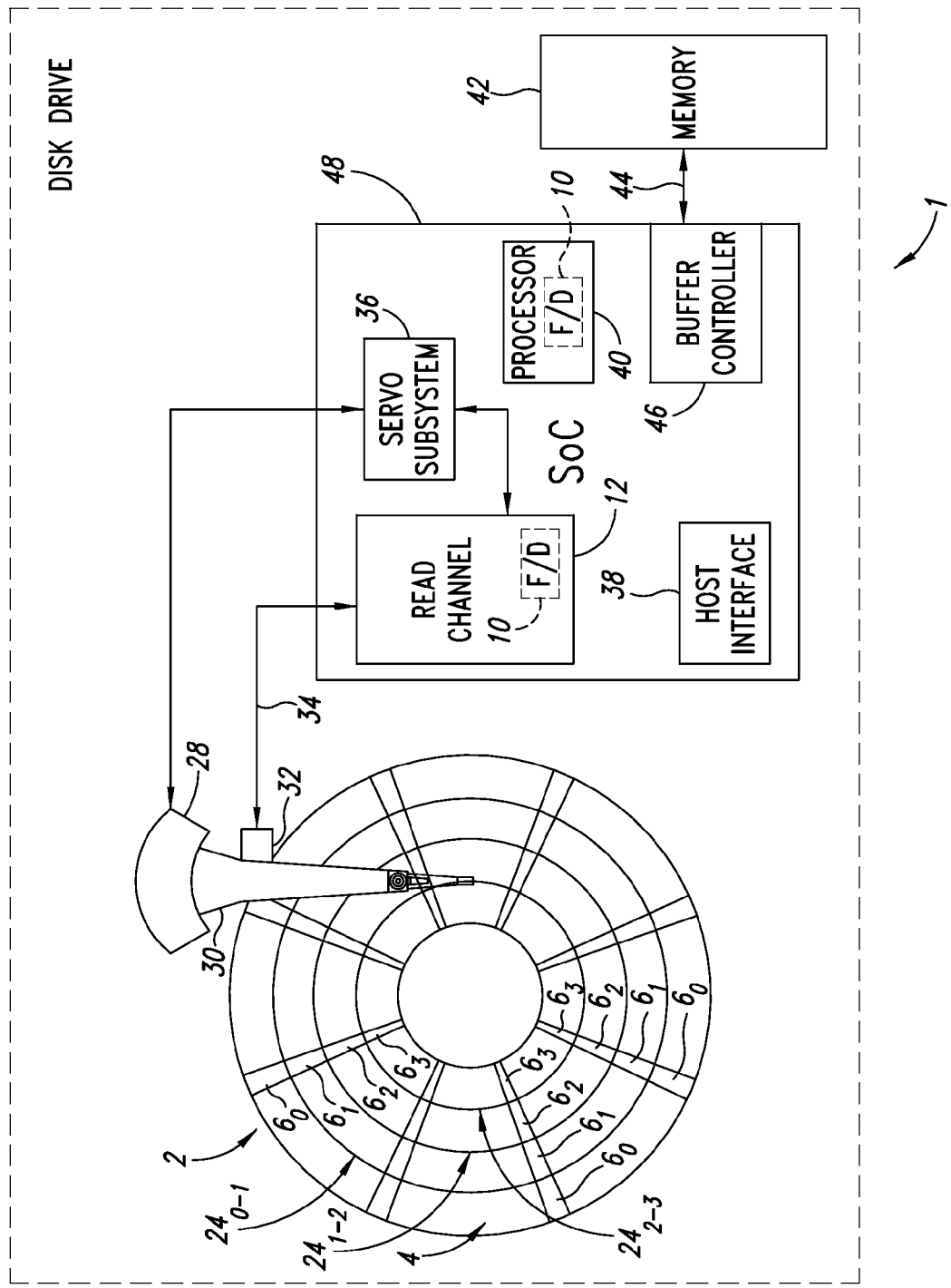
FIG. 2 is a schematic view illustrating in greater detail the example disk drive of FIG. 1, according to one illustrated embodiment.

A number of servo sectors may be generally aligned radially to form servo wedges, as illustrated in FIGS. 1-3. More or fewer servo wedges may be defined on the disk surface 4 in different embodiments. In one embodiment, as illustrated in FIG. 3, the servo sectors are generally aligned radially such that a servo field located towards a middle of the servo sectors is in alignment. For example, an SSM 26 of each servo sector may be radially aligned, as illustrated by the line running radially through the servo zones 6 in FIG. 3. In other embodiments, however, the servo sectors may be generally aligned such that a servo field located towards a beginning of the servo sectors is in alignment. For example, a beginning of the preamble of each servo sector may be radially aligned. Any of the servo fields described above may be used to radially align the servo sectors. Of course, in different embodiments, different alignments may have corresponding ramifications for servo gate timing.

In one embodiment, tracks located near the servo zone boundaries 24 may be mapped out for user data. That is, such tracks may not be used for data storage. By mapping out such tracks, the disk drive 1 may avoid track following near the servo zone boundaries 24, and thus obviate any chattering between servo zones 6. In one embodiment, between one and ten tracks to either side of a servo zone boundary 24 may be mapped out. In another embodiment, between ten and 50 tracks to either side of a servo zone boundary 24 may be mapped out.

Figure 4B:
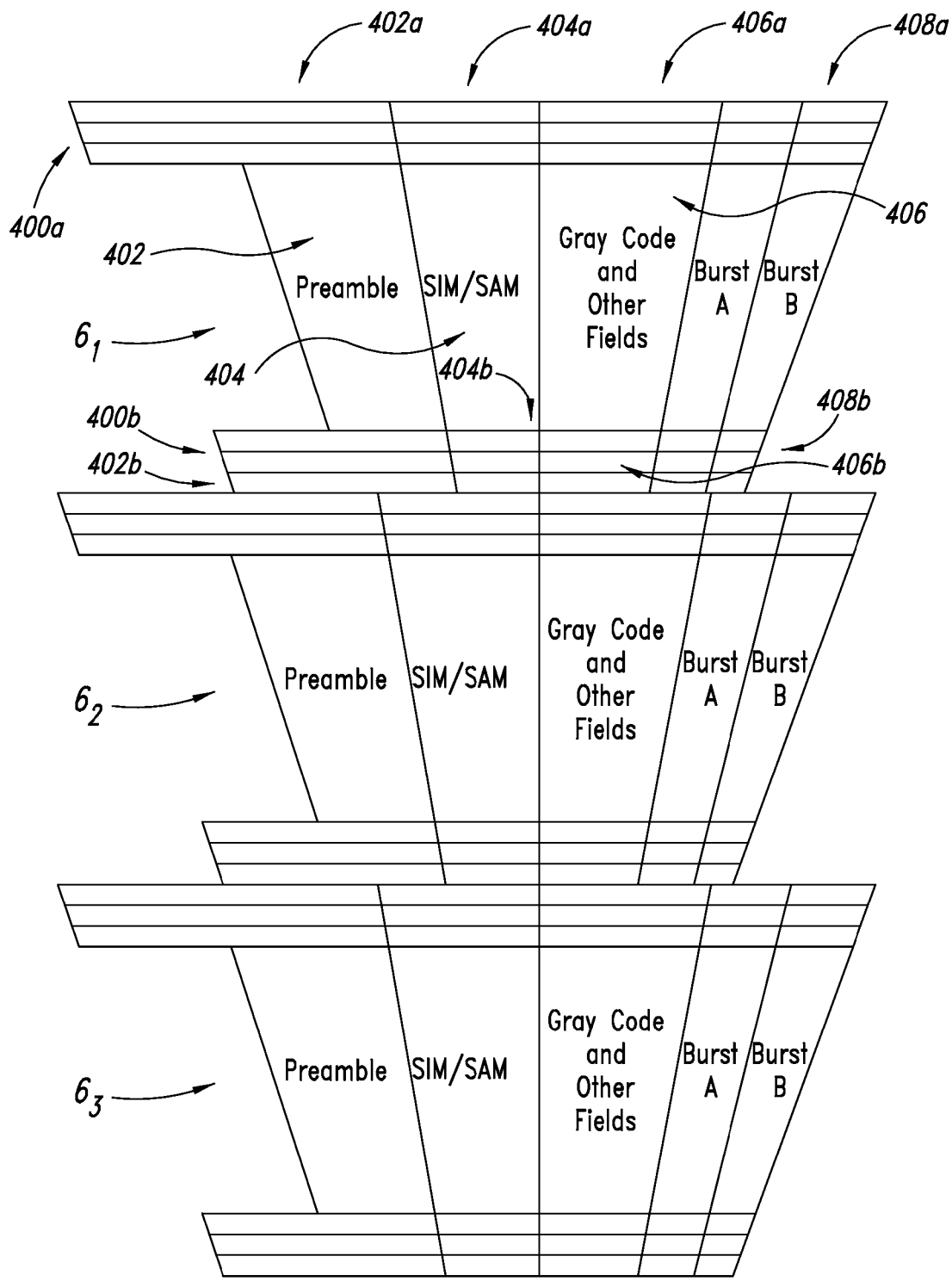
FIG. 4B is a schematic view of servo fields in a plurality of adjacent servo zones, according to one illustrated embodiment.

In some embodiments, the preambles of the servo sectors near servo zone boundaries 24 may be extended in order to enable easier and more robust detection of the servo frequency associated with these servo sectors. FIG. 4B schematically illustrates three of the servo zones $6_1$-$6_3$ with such extended preambles near the servo zone boundaries 24. In one embodiment, as illustrated, each servo zone 6 may include multiple tracks at either end that include extended preambles. For example, servo zone $6_1$ may include a set of servo sectors 400*a* that include extended preambles 402*a* as well as other servo fields 404*a*-408*a* (as described at length above). The servo zone $6_1$ may also have another set of servo sectors 400*b* closer to the inner diameter of the disk 2 that include extended preambles 402*b* as well as other servo fields 404*b*-408*b*. Between these servo sectors 400*a*, 400*b*, the servo zone $6_1$ may include a plurality of servo sectors 400 having shorter preambles 402.

In one embodiment, as described above, the servo sectors 400*a*, 400*b* with extended preambles 402*a*, 402*b* may be associated with tracks that are mapped out. However, in other embodiments, user data may also be recorded on these tracks with extended preambles. Although three tracks with extended preambles are illustrated at each end of the servo zones 6 in FIG. 4B, more or fewer tracks may include extended preambles in different embodiments. In addition, although the extended preambles 402*a*, 402*b* are illustrated in an embodiment in which the servo sectors are aligned along respective servo sync marks (not shown in FIG. 4B), it may be understood that extended preambles may also be implemented in preamble-aligned or SAM-aligned servo formats. The servo zones $6_2$-$6_3$ may be formatted similarly to the servo zone $6_1$.

In one embodiment, the extended preambles 402*a*, 402*b* may be formatted similarly to the preambles 402 found in the rest of the servo zone $6_1$, and they may simply include additional bits recorded at the corresponding frequency. In one embodiment, the extended preambles 402*a*, 402*b* may include at least 125% more bits than the other preambles 402. In another embodiment, the preambles 402*a*, 402*b* may include at least 150% more bits than the other preambles 402. These transition tracks with extended preambles may facilitate a faster, more certain transition between servo zones 6.

In one embodiment, all of the servo sectors comprising the servo zones $6_{0-3}$, including those with extended preambles, may be defined during a servo writing process. For example, in one embodiment, during a servo writing process, some servo sectors 400 are written with a first preamble length, and other servo sectors 400*a*, 400*b* are written with a second, extended preamble length. In other embodiments, all of the servo sectors may initially be written with extended preambles during the servo writing process. In a subsequent manufacturing act, those servo sectors 400 towards the middle of the servo zones 6 may have portions of their preambles 402 overwritten to define relatively shorter preambles 402. Of course, in other embodiments, still other processes for defining shorter and longer preambles may be used.

The servo writing process may be performed in a variety of ways. In one embodiment, an external servowriter may be used to define the servo sectors. In another embodiment, a self-servo write (SSW) method may be employed. In still other embodiments, a magnetic printing process, discrete track recording, bit pattern media pattern process, or any other servo pattern procedure may be used.

The head 8 is actuatable over the disk surface 4 and is operable to write to and read from the disk 2. The head 8 may be operable to generate a signal indicative of at least a portion of a servo sector in a first servo zone $6_2$. For example, the head 8 may read a portion of one or more servo fields of the servo sector, and generate signals indicative of such servo fields. In one embodiment, the head 8 includes a transducer (not illustrated). The transducer may include a writer and a read element. In magnetic recording applications, the transducer's writer may be of a longitudinal or perpendicular design, and the read element of the transducer may be inductive or magneto-resistive. In optical or magneto-optical recording applications, the head 8 may include an objective lens and an active or passive mechanism for controlling a separation of the objective lens from the disk surface 4.

As illustrated, the disk drive 1 may further include a voice coil motor ("VCM") 28 for rotating one or more actuator arms 30 about a pivot in order to actuate the head 8 at different positions over the disk surface 4. Of course, other actuating mechanisms may also be used to move the head 8 relative to the disk 2.

The disk drive 1 further includes a frequency detector 10 operable to determine a servo frequency associated with the servo sector. The frequency detector 10 may comprise any of a variety of firmware and/or hardware operable to determine the servo frequency. Although illustrated outside the read channel 12 in FIG. 1, in one embodiment, the frequency detector 10 may comprise circuitry within the read channel 12. In another embodiment, the frequency detector 10 may comprise firmware executed by a processor (not shown) of the disk drive 1. In yet another embodiment, both read channel circuitry as well as firmware may comprise the frequency detector 10.

The frequency detector 10 may determine the servo frequency associated with the servo sector in a variety of ways (as discussed at length below). In one embodiment, the frequency detector 10 may be configured to determine the servo frequency associated with the servo sector based upon a frequency of a preamble of the servo sector, or a preamble of another servo sector located within the first servo zone $6_2$. For example, in one embodiment, the frequency detector 10 may detect when the head 8 has crossed a servo zone boundary 24 between a second servo zone (e.g., $6_1$ or $6_3$) and the first servo zone $6_2$ based on the characteristics of a preamble of a first servo sector associated with the first servo zone $6_2$. Once the frequency detector 10 has determined that the head 8 has crossed into the first servo zone $6_2$, the frequency detector 10 might then retrieve stored data indicative of the servo frequency associated with the first servo zone $6_2$ and thereby determine the servo frequency associated with the servo sector. In other embodiments, other fields associated with servo sectors may be processed by the frequency detector 10 in order to detect when the head 8 is positioned over the first servo zone $6_2$.

In another embodiment, the frequency detector 10 may determine the servo frequency associated with the servo sector based upon the cylinder addresses/track identifiers previously read within a neighboring servo zone (e.g., $6_1$ or $6_3$). For example, in one embodiment, the frequency detector 10 may receive data indicative of a first previous track identifier associated with a second servo zone (e.g., $6_1$ or $6_3$). The frequency detector 10 may then determine that the head 8 is approaching a servo zone boundary 24 between the second servo zone and the first servo zone $6_2$ based at least in part on the first previous track identifier. For example, if the frequency detector 10 determines that the head is seeking towards the first servo zone $6_2$, and the first previous track identifier indicates that the head 8 is just 20 tracks away from the servo zone boundary 24, then the frequency detector may determine that the head 8 is approaching the servo zone boundary 24. The frequency detector 10 may then retrieve data from memory in the disk drive 1 indicative of the servo frequency associated with the first servo zone $6_2$. In one embodiment, the determination that the head 8 is approaching the servo zone boundary 24 may also be based upon a seek velocity of the head 8.

In one embodiment, the frequency detector 10 may further improve the accuracy with which it predicts the time at which the head 8 will cross the servo zone boundary 24 into the first servo zone $6_2$ by receiving data indicative of a second previous track identifier in the second servo zone after receiving the data indicative of the first previous track identifier. In one embodiment, this second previous track identifier may indicate that the head 8 is so close to the servo zone boundary 24 that the head 8 is predicted to cross the servo zone boundary 24 before a subsequent servo wedge passes underneath the head 8. The frequency detector 10 may thus predict that the head 8 will cross the servo zone boundary 24 into the first servo zone $6_2$, retrieve data indicative of the servo frequency associated with the first servo zone $6_2$, and thereby determine the servo frequency associated with the servo sector.

As illustrated in FIG. 1, the disk drive 1 may further include a read channel 12. During a read operation, a preamplifier (not shown in FIG. 1) may amplify an analog signal detected by the head 8 in order to achieve a signal level that can be processed by the read channel 12. The read channel 12 may then receive the amplified signal and further amplify, filter and convert the analog pulses into digital data that is output to a controller (also not shown in FIG. 1). During a write operation, the read channel 12 may receive digital data from the controller and forward logical signals representative of this digital data to the preamplifier for recording via the head 8.

As illustrated, the read channel 12 includes at least one VCO 14 operable to provide a reference clock 16. Any of a variety of voltage-controlled oscillators configured to provide a frequency determined by an input voltage may be implemented in the read channel 12. In one embodiment, the VCO 14 may comprise one component of a phase-locked loop (described in greater detail with reference to FIG. 5) that may generate one or more frequencies for demodulating portions of the servo sector and/or for timing other disk drive clocks. In one embodiment, the VCO 14 may be operable to provide a reference clock 16 that stays relatively constant over the range of servo frequencies associated with the different servo zones $6_{0-3}$. Although the VCO 14 is illustrated as coupled to the head 8 in FIG. 1, it may be understood that a signal from the head 8 may be processed and modified by a variety of components before some derivative thereof reaches the VCO 14 (as described in greater detail with reference to FIG. 5).

The read channel 12 further includes frequency multiplier/divider circuitry 18 coupled to the VCO 14 and operable to multiply or divide the reference clock 16 from the VCO 14 by a first factor to generate a first servo timing recovery clock 20. The frequency multiplier/divider circuitry 18 may comprise any of a variety of digital and/or analog circuitry configured to multiply and/or divide the reference clock 16 in order to generate the first servo timing recovery clock 20. In one embodiment, the frequency multiplier/divider circuitry 18 may include one or more multiplier circuits, and one or more divider circuits in series or in parallel. The first servo timing recovery clock 20 may have a frequency substantially equal to the servo frequency associated with the servo sector.

In one embodiment, the frequency multiplier/divider circuitry 18 may be configured to multiply or divide the reference clock 16 by a number of selectable factors. For example, the frequency multiplier/divider circuitry 18 may be configured to multiply or divide the reference clock 16 by a first factor based at least in part on the servo frequency determined by the frequency detector 10. In one embodiment, if a different servo frequency is determined by the frequency detector 10, the frequency multiplier/divider circuitry 18 may be configured to multiply or divide the reference clock 16 by a second factor to generate a different servo timing recovery clock 20. Thus, different servo timing recovery clocks 20 may be generated by the frequency multiplier/divider circuitry 18 depending upon the particular factor applied to the reference clock 16. In some embodiments, each of the servo timing recovery clocks 20 has a frequency equal to a servo frequency associated with a corresponding servo zone 6.

In one embodiment, the frequency multiplier/divider circuitry 18 may include at least one rewritable register (not shown in FIG. 1) configured to receive at least one variable used to multiply or divide the reference clock 16. Thus, in one embodiment, the frequency detector 10 may write to the rewritable register in order to change the factor applied by the frequency multiplier/divider circuitry 18 when generating the first servo timing recovery clock 20. The frequency detector 10 may thus relatively quickly change the servo timing recovery clock 20 based at least in part on the servo frequency. In another embodiment, the frequency multiplier/divider circuitry 18 may include a plurality of multiplier/divider circuits associated with different factors and configured to generate different servo timing recovery clocks 20. The frequency multiplier/divider circuitry 18 may further include a switch configured to select among the plurality of multiplier/divider circuits, and the frequency detector 10 may be configured to control the switch in order to change the factor applied by the frequency multiplier/divider circuitry 18. In still other embodiments, other structures/circuitry may be employed to enable the frequency detector 10 to modify the factor applied by the frequency multiplier/divider circuitry 18.

In one embodiment, the frequency multiplier/divider circuitry 18 may be incorporated into a phase-locked loop with the VCO 14. In such a configuration, when the head 8 moves from one servo zone 6 to another, the factor applied by the frequency multiplier/divider circuitry 18 may be changed in order to generate a new servo timing recovery clock 20 corresponding to the servo frequency of the new servo zone 6. Meanwhile, the VCO 14 may maintain a substantially constant reference clock 16, and therefore the time required to synchronize with the new servo zone 6 may be lessened due to the relatively immediate clock change executed in the frequency multiplier/divider circuitry 18. For example, in one embodiment, the frequency multiplier/divider circuitry 18 and the frequency detector 10 may enable a switch to the new servo timing recovery clock 20 with a maximum of one servo wedge latency. In some embodiments, there may be zero servo wedge latency before the correct servo timing recovery clock is enabling servo demodulation.

In one embodiment, the read channel 12 further includes a servo demodulator 22 operable to demodulate the at least a portion of the servo sector using the first servo timing recovery clock 20. In one embodiment, the servo demodulator 22 is coupled (directly or indirectly) to the frequency multiplier/divider circuitry 18, and is further coupled (directly or indirectly) to the head 8 in order to receive a signal therefrom. Any of a variety of servo demodulation circuitry may be used in the servo demodulator 22 in order to derive servo information from different fields comprising the servo sector. The servo demodulator 22 may employ the first servo timing recovery clock 20 in its demodulation process. In one embodiment, for example, the first servo timing recovery clock 20 may be used by the servo demodulator 22 to determine a sampling rate for processing the servo sector.

Referring to FIG. 2, additional circuitry for controlling various functions of the disk drive 1 is illustrated in greater detail. However, in other embodiments, at least some of the illustrated circuitry may be omitted.

As illustrated in FIG. 2, the read channel 12, discussed at length above, may be coupled to the head 8 via a preamplifier 32 and a plurality of read and write lines 34. The preamplifier 32 may be located on the actuator 30 within the disk drive 1, or at a variety of other locations.

The disk drive 1 may further comprise a servo subsystem 36. In one embodiment, the servo subsystem 36 receives a position signal via the preamplifier 32 and the read channel 12 and performs calculations to determine a current position of the head 8 over the disk 2. The servo subsystem 36 may then use these calculations in order to control the VCM 28, and thereby control the position of the head 8.

Disk drive 1 may further include a disk drive host interface 38 that mediates communication with a host computer (not shown). In one embodiment, the disk drive host interface 38 receives commands and data from and transmits status and data to the host computer. The disk drive host interface 38 may comply with any of a number of technical standards. In one embodiment, the disk drive host interface 38 may include a serial interface, such as a Serial Advanced Technology Attachment ("SATA") interface or a Serial Attached Small Computer System Interface ("SAS"). In another embodiment, a parallel interface may be used, such as an Advanced Technology Attachment/Integrated Drive Electronics ("ATA/IDE") interface or a Small Computer System Interface ("SCSI").

Disk drive 1 may further include a processor 40 configured to execute one or more instructions in order to control certain operations performed by the disk drive 1. In one embodiment, the processor 40 may comprise part of a controller and may be configured to execute computer-readable instructions stored on computer-readable memory 42, which is communicatively coupled thereto by at least one data line 44.

The memory 42 may comprise any type of volatile or non-volatile computer-readable memory, such as dynamic random access memory (DRAM) or flash memory. As illustrated, the memory 42 comprises a memory module separate and distinct from the disk 2. However, in other embodiments, various instructions executable by the processor 40 may be stored on the disk 2.

The disk drive 1 may further comprise a buffer controller 46 directly coupled to the memory 42. The buffer controller 46 arbitrates access to the memory 42 by other circuit components. As illustrated, the memory 42 may include firmware and other computer-readable instructions executable by the processor 40.

As illustrated, many of the circuit components may be incorporated into a system on a chip ("SoC") 48. Thus, a single piece of silicon may incorporate the functionality of many of the above-described components. In other embodiments, the circuit components described herein may be implemented on a printed circuit board ("PCB") as separate elements.

As illustrated, the frequency detector 10 may be located in the read channel 12 in a hardware implementation, and/or in the processor 40/memory 42 as a firmware implementation. For example, the computer-readable memory 42 may have instructions stored thereon that are executable by the processor 40 in order to cause the processor 40 to determine the servo frequency associated with the servo sector in a variety of ways, as described in greater detail below. In some embodiments, both hardware and firmware may be used in order to determine the servo frequencies associated with different servo sectors and corresponding servo zones 6.

Figure 5:
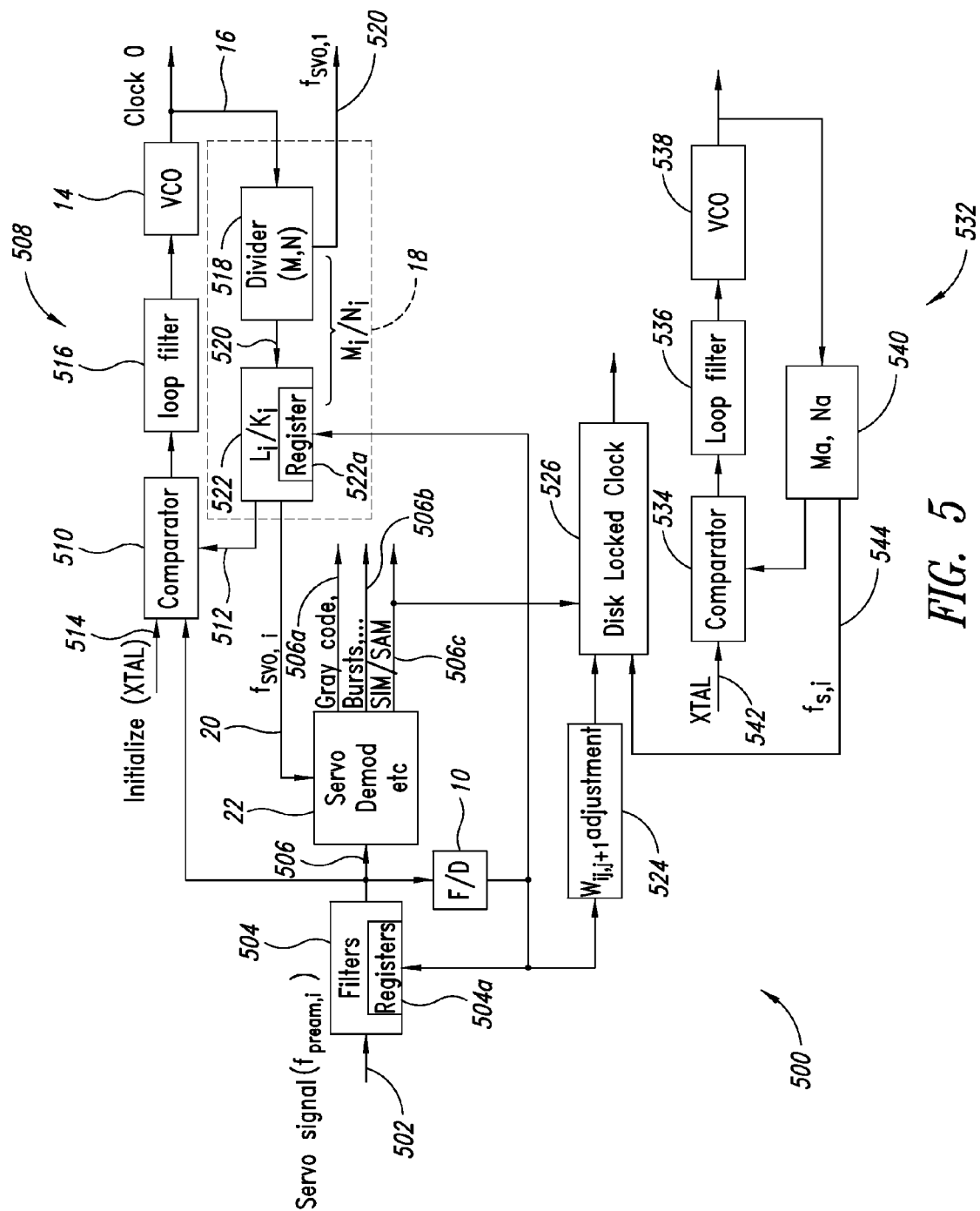
FIG. 5 is a schematic view of example circuitry for use in the disk drive of FIG. 1, according to one illustrated embodiment.

FIG. 5 illustrates in greater detail circuitry and/or firmware 500 both within and external to the read channel 12. Of course, the illustrated circuitry represents just one example embodiment. As illustrated, a servo signal 502 is received by the circuitry 500. The servo signal 502 may be generated by the head 8 and may represent at least a portion of a preamble of a servo sector.

The servo signal 502 may first be filtered/processed by one or more filters 504. In one embodiment, the filters 504 may comprise one or more analog and/or digital filters configured to receive and filter/process the servo signal 502. The filters 504 may include, inter alia, a continuous time filter ("CTF"), a finite impulse response filter ("FIR"), and a magnetic resistive asymmetry ("MRA") linearizer. In other embodiments, additional and/or different filters may be arranged to receive the servo signal 502.

In one embodiment, the filters 504 may be associated with one or more settings that may be optimized in order to effectively filter the servo signal 502 at different servo frequencies. For example, settings for the CTF, FIR and MRA linearizer may be varied at different servo frequencies in order to optimally filter/process the signal for subsequent demodulation. As illustrated, the filters 504 may thus be associated with one or more registers 504a configured to receive and store settings for different servo frequencies. In one embodiment, as described at greater length below, the settings stored in such registers 504a may be adjusted by the frequency detector 10 based at least in part on a servo frequency associated with the first servo zone $6_2$. For example, a number of settings for the filters 504a may be stored in the memory 42 or on the disk 2 and may be associated with different servo frequencies. When the frequency detector 10 determines that the head 8 has crossed a servo zone boundary 24 into the first servo zone $6_2$, these settings may be accessed by the frequency detector 10, and the registers 504a may be programmed with the new settings. In other embodiments, different circuitry configured to change the settings associated with the filters 504 may be used.

The filtered servo signal 506 may be routed from the filters 504 to a variety of different circuitry. In one embodiment, the filtered servo signal 506 is transmitted to the servo demodulator 22, and, as illustrated, the servo demodulator 22 may demodulate and extract information indicative of the gray code and other fields 506a, servo bursts 506b and SIM/SAM 506c from the filtered servo signal 506.

The filtered servo signal 506 may also be transmitted to the frequency detector 10, whether implemented in firmware and/or hardware. For example, the filtered servo signal 506 may be forwarded to hardware within the read channel 12. In another embodiment, the filtered servo signal 506 or another signal derived from the filtered servo signal 506 may be transmitted to the processor 40.

The filtered servo signal 506 may also be transmitted to a first phase-locked loop ("PLL") 508. In particular, the filtered servo signal 506 (indicative of a preamble of a servo sector) may be routed to a comparator 510 of the PLL 508, which may then compare the filtered servo signal 506 against a frequency 512 generated by the frequency multiplier/divider circuitry 18. As illustrated, the PLL 508 may be initialized using a crystal clock 514. However, after initialization, the PLL 508 may be configured to lock onto and generate a servo timing recovery clock 20 based upon the filtered servo signal 506.

As illustrated, the PLL 508 may comprise the comparator 510, a loop filter 516, the VCO 14, and the frequency multiplier/divider circuitry 18. In one embodiment, the frequency multiplier/divider circuitry 18 comprises a first divider 518 coupled to the VCO 14 and configured to divide the reference clock 16 from the VCO 14 to generate a substantially constant clock 520. The substantially constant clock 520 may then be used to time a variety of operations in the disk drive 1. The substantially constant clock 520 may be received by additional multiplier/divider circuitry 522 configured to multiply or divide the substantially constant clock 520 in order to generate the first servo timing recovery clock 20. This servo timing recovery clock 20 may then be used (as illustrated) by the servo demodulator 22 in order to demodulate the filtered servo signal 506.

In one embodiment, the additional multiplier/divider circuitry 522 may include at least one rewritable register 522a configured to receive at least one variable used to multiply or divide the reference clock 16 from the VCO 14 to generate the first servo timing recovery clock 20. As illustrated, the frequency detector 10 may be coupled to the register 522a, and the variable stored in this register 522a may be adjusted by the frequency detector 10 based at least in part on a servo frequency associated with the first servo zone $6_2$. For example, a number of variables may be stored in the memory 42 or on the disk 2 and may be associated with different servo frequencies. When the frequency detector 10 determines that the head 8 has crossed a servo zone boundary 24 into the first servo zone $6_2$, these variables may be accessed by the frequency detector 10, and the register 522a may be programmed with a new variable corresponding to the first servo zone $6_2$. In other embodiments, other structures for changing the effective factor associated with the frequency multiplier/divider circuitry 18 may also be used. For example, in one embodiment, a non-digital implementation may be used in order to adjust the effective factor.

Figure 6:
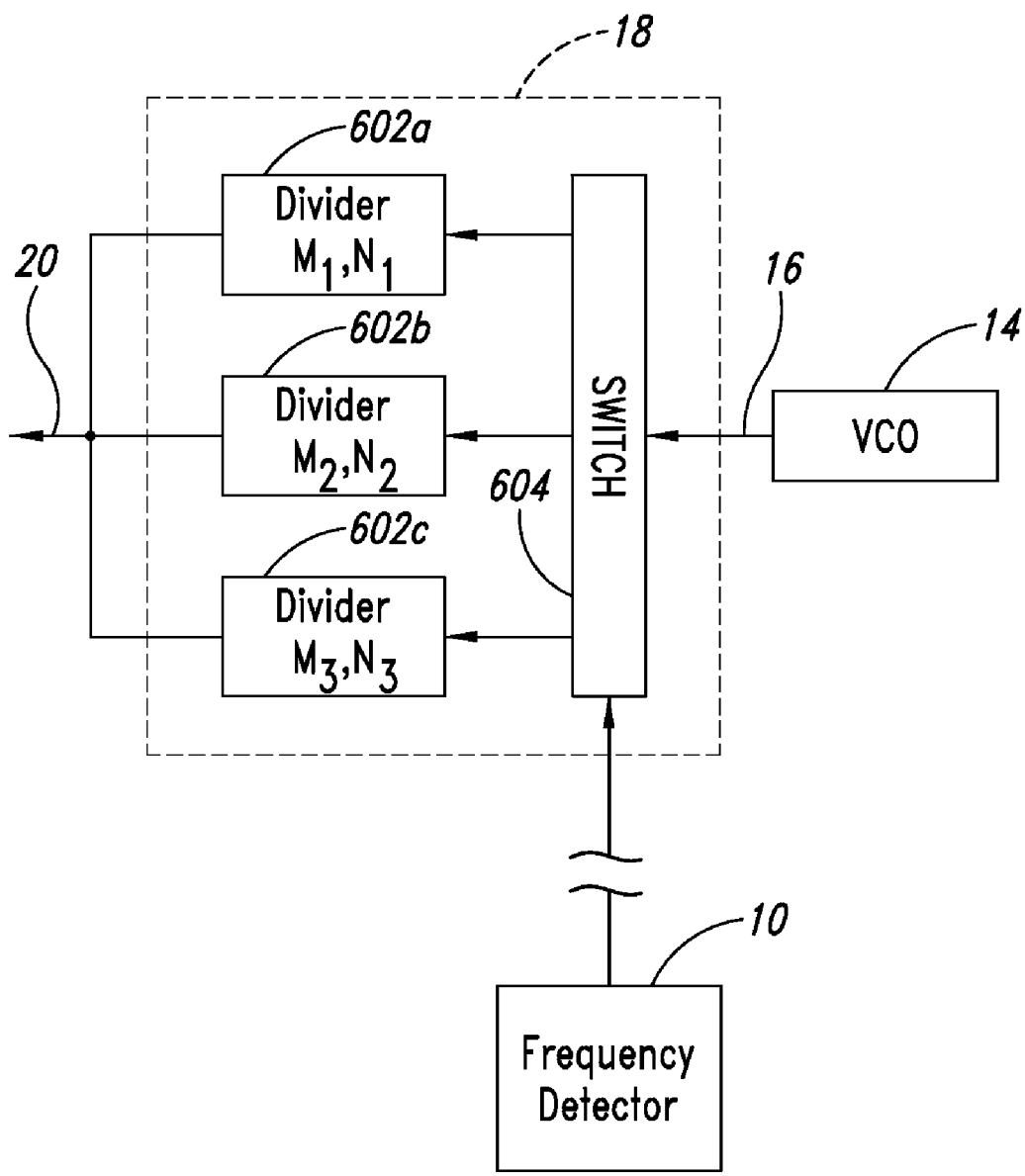
FIG. 6 is a schematic view of example frequency multiplier/divider circuitry, according to one illustrated embodiment.

In one embodiment, illustrated in FIG. 6, the frequency multiplier/divider circuitry 18 may comprise a plurality of multiplier/divider circuits 602a-c coupled to a switch 604. Each of the multiplier/divider circuits 602a-c may be associated with different factors and may be configured to generate different servo timing recovery clocks. The switch 604 (which may be controlled by the frequency detector 10) may therefore be configured to select among the plurality of multiplier/divider circuits 602a-c depending upon the current servo zone 6.

As illustrated, the frequency detector 10 is communicatively coupled to the frequency multiplier/divider circuitry 18, to the filters 502, and to wedge-to-wedge timing adjustment circuitry 524. The frequency detector 10 may thus send to these different circuit components one or more signals related to the servo frequency associated with the servo sector 8. These signals may be configured to change one or more operating variables associated with each of these circuit components.

Figure 10A:
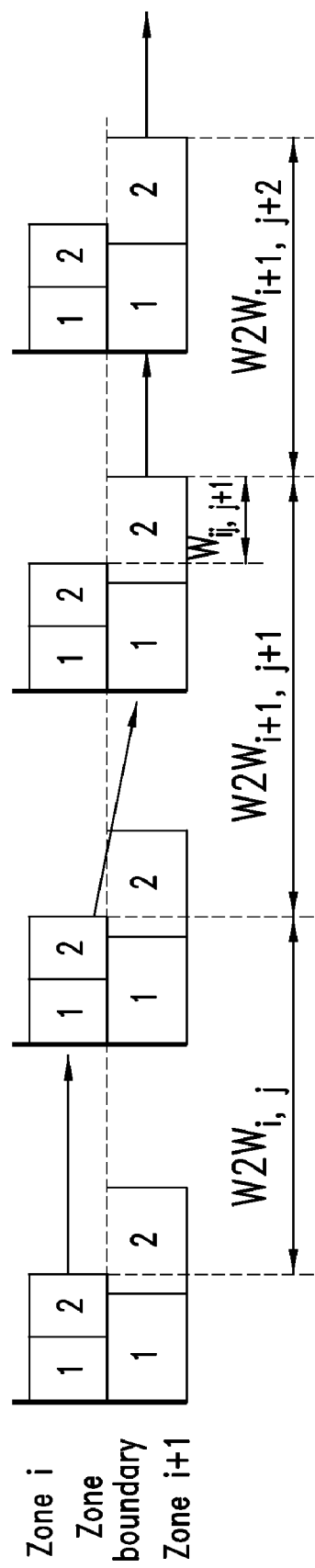
FIG. 10A is a schematic view of wedge-to-wedge timing changes when transitioning from a higher frequency servo zone to a lower frequency servo zone, according to one illustrated embodiment.
Figure 10B:
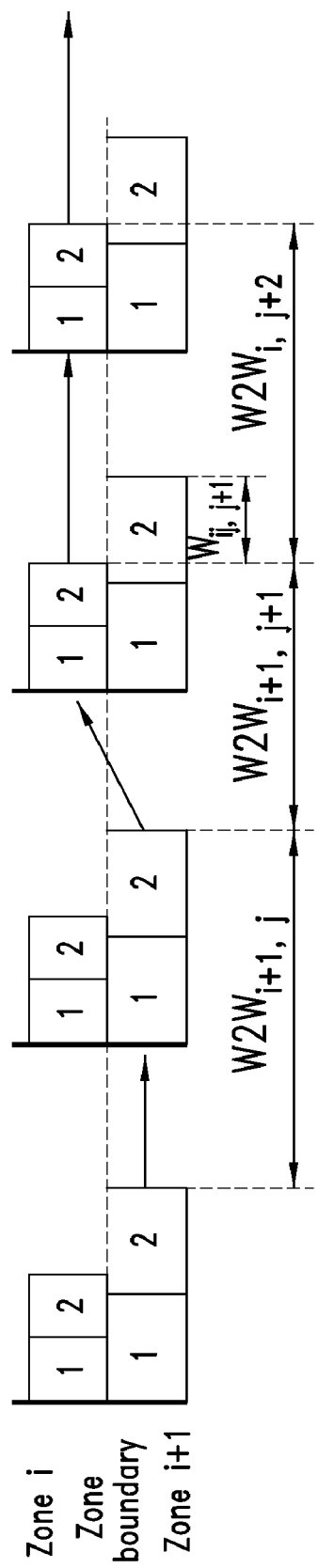
FIG. 10B is a schematic view of wedge-to-wedge timing changes when transitioning from a lower frequency servo zone to a higher frequency servo zone, according to one illustrated embodiment.

In one embodiment, the wedge-to-wedge timing adjustment circuitry 524 may be configured to adjust the wedge-to-wedge timing between adjacent servo wedges when the head 8 is crossing over a servo zone boundary 24 (as described in greater detail below with reference to FIGS. 10A and 10B). As illustrated, the wedge-to-wedge timing adjustment circuitry 524 may output a signal that comprises one input to the disk locked clock 526, which may be used to time a servo gate for reading servo wedges.

The other input of the disk locked clock 526 may originate from a second phase-locked loop 532. The PLL 532 may comprise a comparator 534, a loop filter 536, a VCO 538 and multiplier/divider circuitry 540. A clock signal 542 from a crystal oscillator may comprise the input to the PLL 532, and the output clock signal 544 may be configured to time the disk locked clock 526, adjusted as necessary by detection of the SIM/SAM and the wedge-to-wedge timing adjustment circuitry 524.

Figure 7:
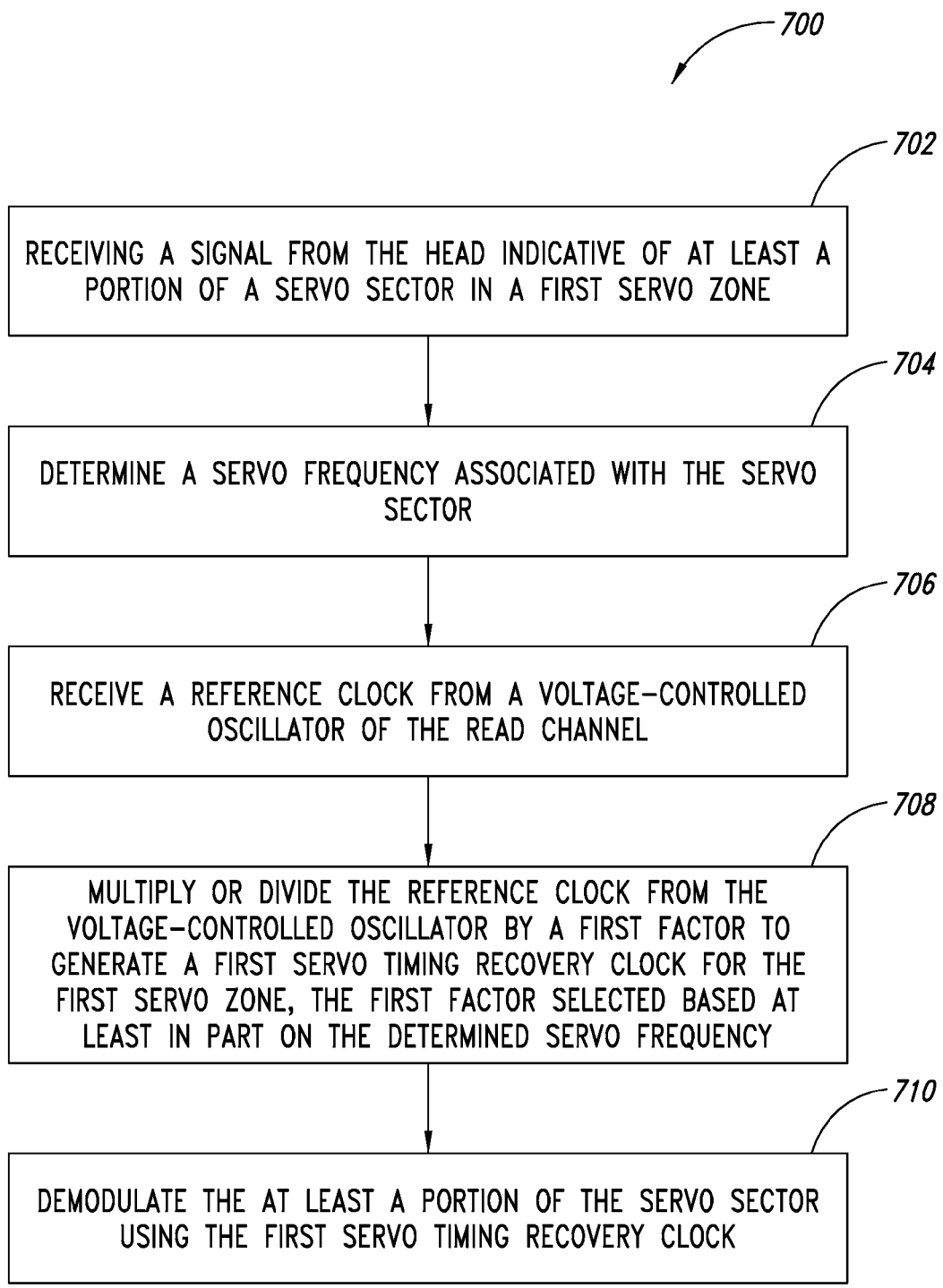
FIG. 7 is a flow chart illustrating one method of operating a disk drive, according to one illustrated embodiment.

FIG. 7 illustrates a flow diagram for a method 700 of operating a disk drive, according to one embodiment. The method 700 will be discussed in the context of the disk drive 1 of FIGS. 1-5 with reference to FIGS. 8-10B. However, the acts disclosed herein may be executed in a variety of different disk drives or other storage devices, in accordance with the described method.

At act 702, a signal 502 from the head 8 indicative of at least a portion of a servo sector in a first servo zone $6_2$ is received. In one embodiment, the signal 502 from the head 8 is received at the read channel 12 via the preamplifier 32. The signal 502 may be amplified, conditioned, filtered or otherwise modified before receipt.

As described above, the servo sector may comprise a number of different servo fields, and the signal 502 may be indicative of any portion of one or more of those servo fields. In one embodiment, the signal 502 may be indicative of at least a portion of a preamble of the servo sector. The first servo zone $6_2$ may be associated with any of a variety of servo frequencies. In one embodiment, the first servo zone $6_2$ may have a servo frequency that is greater than that of servo zone $6_3$ and less than that of servo zone $6_1$.

At act 704, a servo frequency associated with the servo sector is determined. The servo frequency associated with the servo sector may be determined in any of a variety of ways, as discussed above. In one embodiment, a frequency detector 10 (implemented in firmware and/or hardware) may be used to determine the servo frequency associated with the servo sector.

In a firmware embodiment, determining the servo frequency may comprise executing instructions in a processor 40 of the disk drive 1. In some embodiments, the processor 40 may determine a servo frequency associated with the first servo zone $6_2$ in order to determine the servo frequency associated with the servo sector. For example, the processor 40 may determine the servo frequency of a new servo zone each time a servo zone boundary is crossed, and it may then be assumed that the same servo frequency will be used throughout the servo zone in each servo sector. Determining the servo frequency may thus include receiving data indicative of a first previous track identifier associated with a second servo zone (e.g., servo zone $6_1$ or $6_3$). It may then be determined based at least in part on the first previous track identifier that the head 8 is approaching a servo zone boundary (e.g., servo zone boundary $24_{1-2}$ or $24_{2-3}$) between the second servo zone and the first servo zone $6_2$. Upon determining that the head 8 is approaching the servo zone boundary, data indicative of the servo frequency associated with the first servo zone $6_2$ may be retrieved. For example, in one embodiment, data indicative of the servo frequencies of all of the servo zones $6_{0-3}$ may be stored in the memory 42, and may be retrieved as the head 8 approaches a servo zone boundary.

In one embodiment, the processor 40 may further receive data indicative of a seek velocity of the head 8, and it may be determined that the head 8 is approaching the servo zone boundary based at least in part on the seek velocity. Thus, the seek velocity may be taken into account in predicting a servo zone boundary crossing. In another embodiment, other factors may be taken into account in predicting a servo zone boundary crossing. For example, an acceleration of the head 8 may be taken into account, which may be determined based upon a control signal applied to the VCM 28, as well as a flex cable bias force.

Figure 9A:
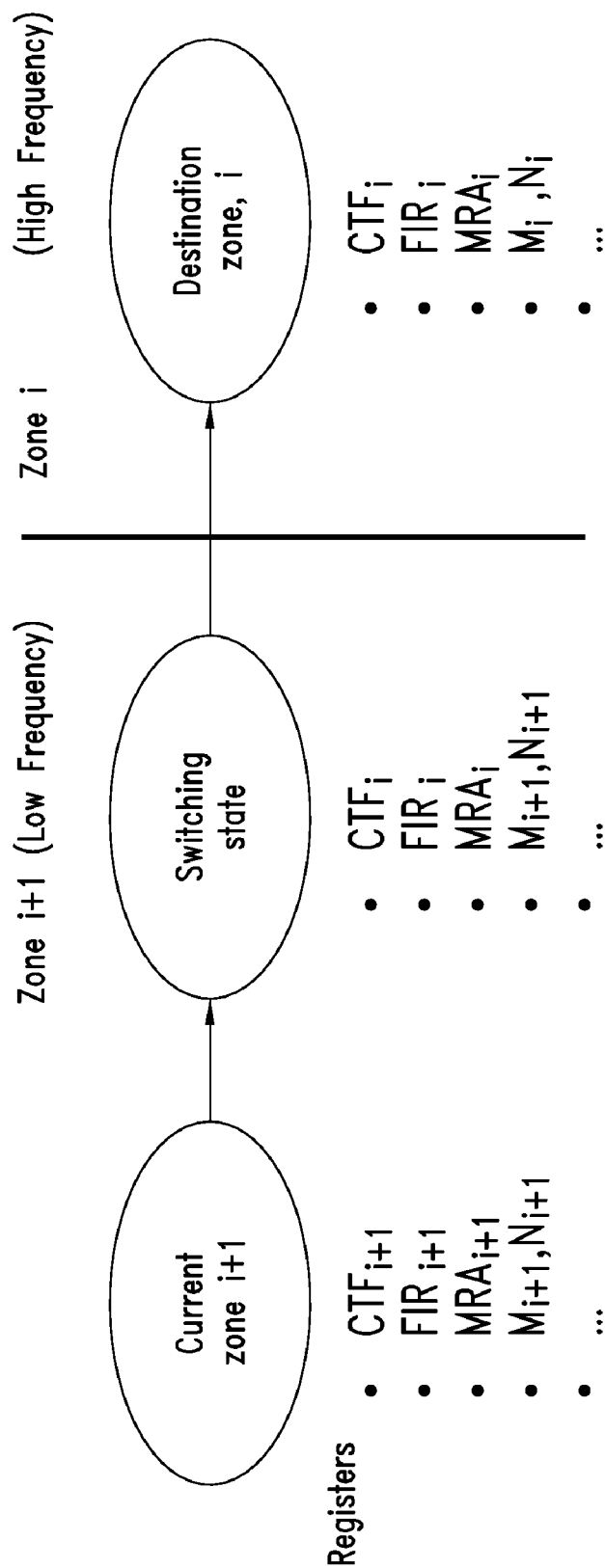
FIG. 9A is a basic flow chart illustrating changes made to a plurality of parameters when transitioning from a lower frequency servo zone to a higher frequency servo zone, according to one illustrated embodiment.

The head 8 may be approaching the first servo zone $6_2$ from a servo zone of higher or lower frequency. Assuming that the head 8 is approaching the first servo zone $6_2$ from a second servo zone $6_3$ having a lower frequency, one example flow chart illustrating changes made to a plurality of parameters when transitioning from the second servo zone $6_3$ to the first servo zone $6_2$ is illustrated in FIG. 9A. In one embodiment, upon determining that the head 8 is approaching the servo zone boundary $24_{2-3}$, the read channel 12 may be placed in a switching state, wherein a setting for at least one analog filter (e.g., at least one of the filters 502) between the head 8 and the servo demodulator 22 is calibrated to the first servo zone $6_2$, and the reference clock 16 from the VCO 14 is multiplied or divided by a second factor different than a first factor to generate a second servo timing recovery clock 20 based at least in part on a second servo frequency associated with the second servo zone $6_3$. That is, some filtering and/or signal conditioning settings may be changed before the servo timing recovery clock 20 is adjusted. As illustrated in FIG. 9A, in one embodiment, CTF, FIR and MRA linearizer settings may be changed before the variables, M and N, used to change the factor applied by the frequency multiplier/divider circuitry 18. This process may ready the read channel 12 to efficiently and effectively filter servo sectors in the first servo zone $6_2$ before the head 8 has crossed the servo zone boundary $24_{2-3}$. In one embodiment, this may facilitate the process of synchronization once the head 8 has crossed the servo zone boundary $24_{2-3}$. As illustrated in FIG. 9A, after the head 8 has crossed the servo zone boundary $24_{2-3}$, the filter settings applied at the read channel 12 may be maintained, and the variables for the frequency multiplier/divider circuitry 18 may be adjusted for the servo frequency of the first servo zone $6_2$.

In one embodiment, two sets of registers in the filters 504 and in the frequency multiplier/divider circuitry 18 may be used in order to implement the switching state. For example, in order to enter the switching state, one set of "switching state" registers in the filters 504 may be programmed as illustrated in FIG. 9A, and the filters 504 may apply the settings in those "switching state" registers. Once the read channel 12 has exited the switching state and the head 8 is over the first servo zone $6_2$, a set of "permanent" registers in the filters 504 may be programmed as illustrated in FIG. 9A, and the filters 504 may apply the settings in those "permanent" registers. Similar registers may be used in the frequency multiplier/divider circuitry 18. In some embodiments, these registers may be pre-programmed with upcoming servo zone settings/variables in order to make the switching process even faster.

Figure 9B:
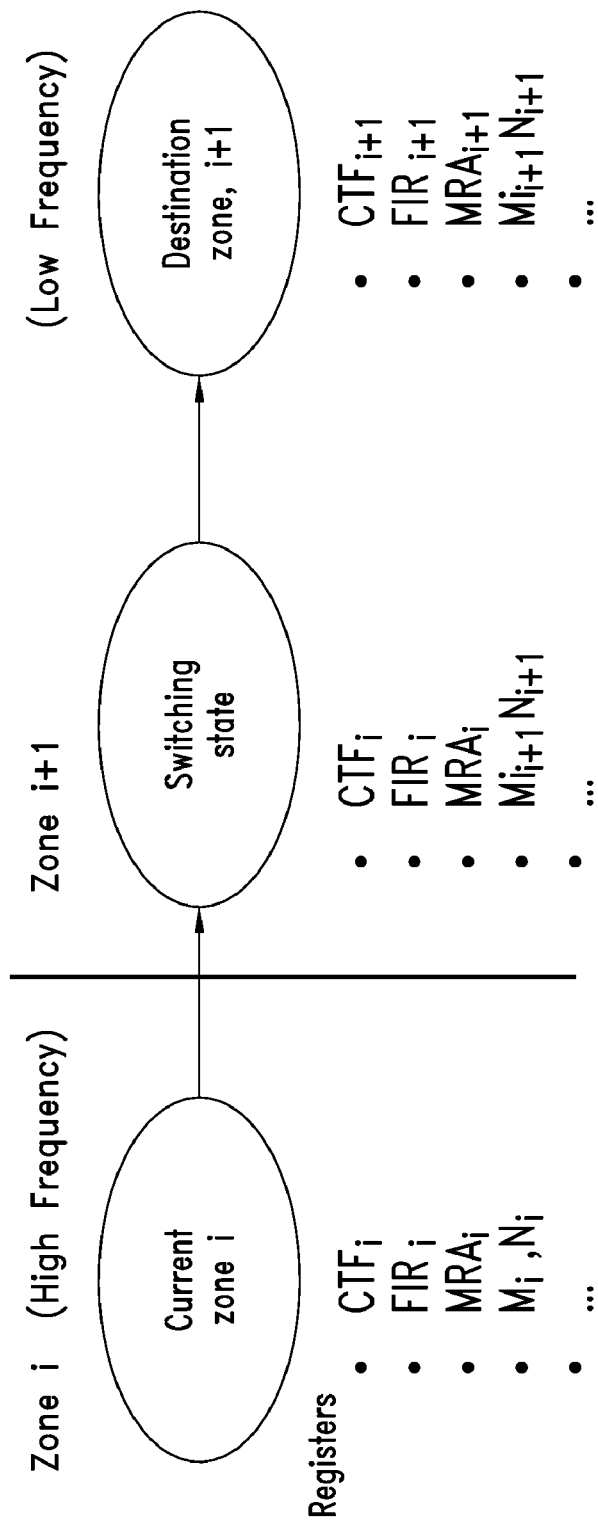
FIG. 9B is a basic flow chart illustrating changes made to a plurality of parameters when transitioning from a higher frequency servo zone to a lower frequency servo zone, according to one illustrated embodiment.

Assuming that the head 8 is approaching the first servo zone $6_2$ from a second servo zone $6_1$ having a higher frequency, one example flow chart illustrating changes made to a plurality of parameters when transitioning from the second servo zone $6_1$ to the first servo zone $6_2$ is illustrated in FIG. 9B. In one embodiment, the read channel 12 may not be placed in a switching state before crossing the servo zone boundary $24_{1-2}$ because the filter settings used for the higher frequency second servo zone $6_1$ may work relatively well for the lower frequency first servo zone $6_2$ as well. However, once the servo zone boundary $24_{1-2}$ has been crossed, the read channel 12 may enter a switching state, wherein a setting for at least one analog filter (e.g., at least one of the filters 502) between the head 8 and the servo demodulator 22 is calibrated to the second servo zone $6_1$, but the reference clock 16 from the VCO 14 is multiplied or divided by the first factor to generate the first servo timing recovery clock 20 associated with the first servo zone $6_2$. That is, the servo timing recovery clock 20 may be changed before some filtering and/or signal conditioning settings are adjusted. As illustrated in FIG. 9B, in one embodiment, the variables, M and N, used to change the factor applied by the frequency multiplier/divider circuitry 18 may be changed before the CTF, FIR and MRA linearizer settings. In one embodiment, this may facilitate the process of synchronization once the head 8 has crossed the servo zone boundary $24_{1-2}$. As illustrated in FIG. 9B, after the head 8 has crossed the servo zone boundary $24_{1-2}$, the filter settings applied at the read channel 12 may be changed, and the variables for the frequency multiplier/divider circuitry 18 may be maintained.

In one embodiment, the processor 40 may be further configured to receive data indicative of a second previous track identifier associated with the second servo zone (e.g., servo zone $6_1$ or $6_3$), the data indicative of the second previous track identifier received after the data indicative of the first previous track identifier. It may then be predicted based at least in part on the second previous track identifier that the head 8 will cross the servo zone boundary before a subsequent servo wedge passes underneath the head 8. Thus, in one embodiment, the processor 40 may first determine that a servo zone boundary is approaching, and may then determine that the head 8 will cross the servo zone boundary before another servo wedge. For example, the first previous track identifier may be indicative of a track 50 tracks away from the servo zone boundary, and the second previous track identifier may be indicative of a track just two tracks away from the servo zone boundary. Of course, such determinations and predictions may be dependent upon a seek velocity of the head 8.

In one embodiment, as described in greater detail with reference to act 708, the reference clock 16 from the VCO 14 is then multiplied or divided to generate the first servo timing recovery clock 20 based at least in part on the prediction that the head 8 will cross the servo zone boundary and on the servo frequency associated with the first servo zone $6_2$.

Figure 8:
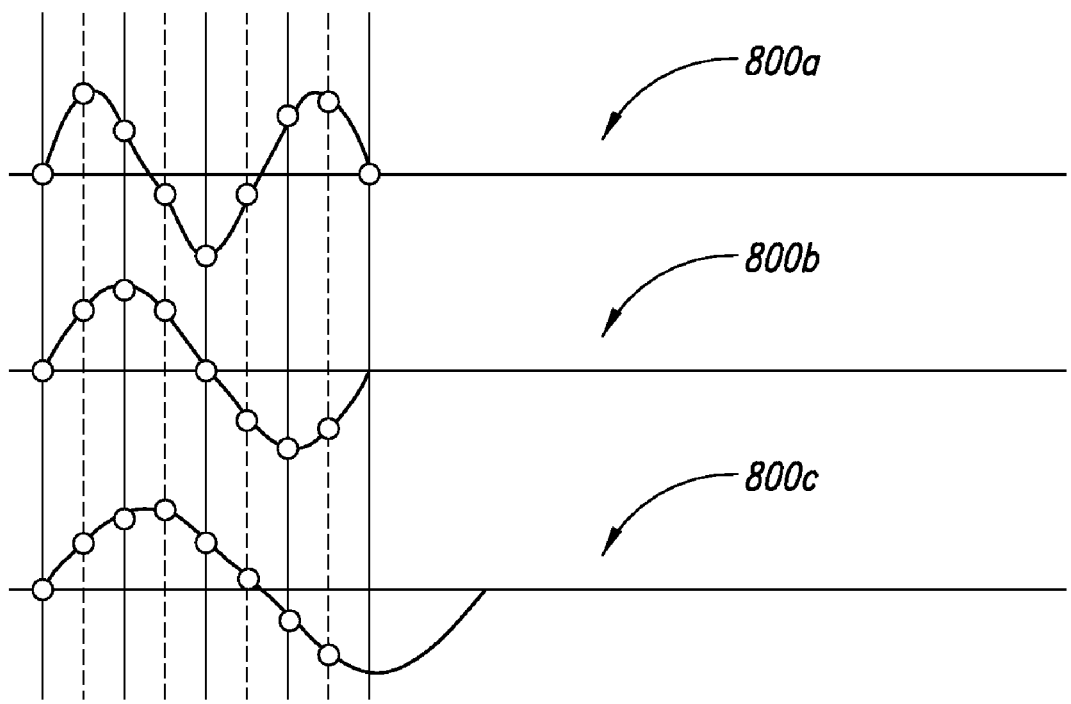
FIG. 8 includes three graphs showing example read channel samples taken at three different servo frequencies, according to one illustrated embodiment.

In other embodiments, the servo frequency may be determined using circuitry/hardware within the read channel 12. For example, in one embodiment, determining the servo frequency may include detecting when the head 8 has crossed a servo zone boundary between a second servo zone and the first servo zone $6_2$ based on characteristics of a preamble of a first servo sector associated with the first servo zone $6_2$. In one embodiment, as illustrated in FIG. 8, the characteristics of the preamble may be quantified by sampling the preamble signal. The three graphs 800a-c show three example preamble waveforms and corresponding samples taken therefrom. Different servo frequencies may yield very different samples, and different characteristics of these samples may be used to quickly and accurately detect that the head 8 has crossed a servo zone boundary. Of course, in other embodiments, different characteristics of the preamble may be evaluated to detect when the head 8 has crossed a servo zone boundary. For example, a Discrete Fourier Transform ("DFT") or sampling pattern matching may be used to detect a servo zone boundary crossing.

In one embodiment, before detecting when the head 8 has crossed the servo zone boundary, it may be predicted that the head 8 will cross the servo zone boundary may be made by executing instructions in a processor 40 of the disk drive 1, as described at length above. In other embodiments, the above-described and other forms of hardware and firmware detection may be combined.

At act 706, a reference clock 16 from the VCO 14 of the read channel 12 is received. As described above, in one embodiment, the reference clock 16 may remain substantially constant throughout the different servo zones $6_{0-3}$ and their associated servo frequencies.

At act 708, the reference clock 16 from the VCO 14 is multiplied or divided by a first factor to generate a first servo timing recovery clock 20 for the first servo zone $6_2$, the first factor selected based at least in part on the determined servo frequency. In one embodiment, as described above, the reference clock 16 may be multiplied or divided (as used in this phrase, it may be understood to mean and/or) by frequency multiplier/divider circuitry 18 to generate the first servo timing recovery clock 20. The first factor may be selected based at least in part on the determined servo frequency, such that the first servo timing recovery clock 20 is configured to be in phase with and at a same frequency as the servo frequency associated with the servo sector.

This frequency multiplier/divider circuitry 18 may take any of a variety of forms, including those discussed at length above. For example, in one embodiment, multiplying or dividing the reference clock 16 from the VCO 14 may include setting at least one rewritable register 522a with at least one variable used to multiply or divide the reference clock 16 from the VCO 14 to generate the first servo timing recovery clock 20. In another embodiment, multiplying or dividing the reference clock 16 from the VCO 14 may include switching between a plurality of multiplier/divider circuits 602a-c associated with different factors and configured to generate different servo timing recovery clocks 20. In yet another embodiment, multiplying or dividing the reference clock 16 may include dividing the reference clock 16 to generate a substantially constant clock 520, and multiplying or dividing the substantially constant clock 520 to generate the first servo timing recovery clock 20.

At act 710, the at least a portion of the servo sector may be demodulated using the first servo timing recovery clock 20. As described above, any of a variety of demodulation algorithms may be applied in order to extract servo information from the servo sector based at least in part on the first servo timing recovery clock 20.

In one embodiment, upon initial synchronization of the PLL 508, the disk drive 1 may use settings and variables associated with one of the servo zones 6. If the PLL 508 is unable to effectively synchronize with the servo sectors passing underneath the head 8 using those settings and variables, the settings and variables associated with another of the servo zones 6 may be used, until the disk drive 1 has correctly identified the current servo zone 6.

In different embodiments, other changes to disk drive functionality may also be made based upon the servo zone boundary crossings. For example, as illustrated in FIGS. 10A and 10B, the wedge-to-wedge timing may change. Turning to FIG. 10A, for example, a wedge-to-wedge timing between adjacent servo wedges in one servo zone (e.g., first servo zone $6_2$) may be represented by $W2W_{i,j}$, wherein i represents the ith servo zone and j represents the jth servo wedge. As is clearly visible in FIG. 10A, as the head 8 moves from one servo zone (e.g., first servo zone $6_2$) to another servo zone having a lower servo frequency (e.g., servo zone $6_3$), a wedge-to-wedge timing adjustment variable $W_{i,j,j+1}$ may be used to account for the difference in wedge-to-wedge timing between the two servo zones. This wedge-to-wedge timing adjustment variable $W_{i,j,j+1}$ may be based at least in part on the servo zone boundary crossing, as well as on the servo wedge at which the head 8 crossed, and may be used once to transition from one servo zone 6 to the next. Once in the next servo zone 6, the appropriate wedge-to-wedge timing for that servo zone 6 may be applied. A very similar wedge-to-wedge timing adjustment is illustrated in FIG. 10B, as the head 8 moves from a servo zone 6 of lower frequency to a servo zone 6 of higher frequency. The wedge-to-wedge timing adjustment may be implemented in a variety of ways. In one embodiment, as illustrated in FIG. 5, the frequency detector 10 may be coupled to wedge-to-wedge timing adjustment circuitry 524, and, upon determining that the head 8 will cross or has already crossed a servo zone boundary 24, the frequency detector 10 may send a signal to the wedge-to-wedge timing adjustment circuitry 524 causing it to make an appropriate adjustment. In other embodiments, other circuitry and/or firmware implementations may be used.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

We claim:

1. A disk drive comprising:
a disk having a disk surface including a plurality of servo zones of different servo frequencies;
a head actuatable over the disk surface, the head operable to generate a signal indicative of at least a portion of a servo sector in a first servo zone;
a frequency detector operable to determine a servo frequency associated with the servo sector; and
a read channel coupled to the head, the read channel including:
a voltage-controlled oscillator operable to provide a reference clock;
frequency multiplier/divider circuitry operable to multiply or divide the reference clock from the voltage-controlled oscillator by a first factor to generate a first servo timing recovery clock for the first servo zone of the plurality of servo zones having different servo frequencies, the first factor selected based at least in part on the servo frequency from the different servo frequencies determined by the frequency detector; and
a servo demodulator operable to demodulate the at least a portion of the servo sector using the first servo timing recovery clock.

2. The disk drive of claim 1, wherein the frequency detector comprises:
a processor operable to execute instructions; and
a computer-readable memory having instructions stored thereon that are executable by the processor in order to cause the processor to determine the servo frequency associated with the servo sector.

3. The disk drive of claim 2, wherein the computer-readable memory has further instructions stored thereon that are executable by the processor in order to cause the processor to determine the servo frequency associated with the servo sector, by:
  receiving data indicative of a first previous track identifier associated with a second servo zone;
  determining that the head is approaching a servo zone boundary between the second servo zone and the first servo zone based at least in part on the first previous track identifier; and
  upon determining that the head is approaching the servo zone boundary, retrieving data from the computer-readable memory indicative of the servo frequency associated with the first servo zone.

4. The disk drive of claim 3, wherein the computer-readable memory has further instructions stored thereon that are executable by the processor in order to cause the processor to determine the servo frequency associated with the servo sector, by:
  receiving data indicative of a seek velocity of the head;
  wherein determining that the head is approaching the servo zone boundary is based at least in part on the seek velocity.

5. The disk drive of claim 3, wherein the computer-readable memory has further instructions stored thereon that are executable by the processor in order to cause the processor to determine the servo frequency associated with the servo sector, by:
  upon determining that the head is approaching the servo zone boundary, placing the read channel in a switching state, wherein a setting for at least one analog filter between the head and the servo demodulator is calibrated to the first servo zone and the frequency multiplier/divider circuitry is configured to multiply or divide the reference clock by a second factor different than the first factor to generate a second servo timing recovery clock based at least in part on a second servo frequency associated with the second servo zone.

6. The disk drive of claim 5, wherein the computer-readable memory has further instructions stored thereon that are executable by the processor in order to cause the processor to determine the servo frequency associated with the servo sector, by:
  receiving data indicative of a second previous track identifier associated with the second servo zone, the data indicative of the second previous track identifier received after the data indicative of the first previous track identifier; and
  predicting that the head will cross the servo zone boundary between the second servo zone and the first servo zone before a subsequent servo wedge passes underneath the head based at least in part on the second previous track identifier.

7. The disk drive of claim 6, wherein the computer-readable memory has further instructions stored thereon that are executable by the processor in order to cause the processor to determine the servo frequency associated with the servo sector, by:
  upon predicting that the head will cross the servo zone boundary, changing at least one setting of the frequency multiplier/divider circuitry such that the frequency multiplier/divider circuitry generates the first servo timing recovery clock using the first factor based at least in part on the servo frequency associated with the first servo zone.

8. The disk drive of claim 1, wherein the frequency detector comprises circuitry within the read channel.

9. The disk drive of claim 8, wherein the frequency detector is configured to detect when the head has crossed a servo zone boundary between a second servo zone and the first servo zone based on characteristics of a preamble of a first servo sector associated with the first servo zone.

10. The disk drive of claim 9, wherein the frequency detector is configured to change at least one setting of the multiplier/divider circuitry upon detecting that the head has crossed the servo zone boundary, such that the frequency multiplier/divider circuitry generates the first servo timing recovery clock using the first factor based at least in part on the servo frequency associated with the first servo zone.

11. The disk drive of claim 9, wherein the frequency detector further comprises:
  a processor operable to execute instructions; and
  a computer-readable memory having instructions stored thereon that are executable by the processor in order to cause the processor to predict that the head will cross the servo zone boundary.

12. The disk drive of claim 11, wherein the computer-readable memory has further instructions stored thereon that are executable by the processor in order to cause the processor to predict that the head will cross the servo zone boundary, by:
  receiving data indicative of a first previous track identifier associated with the second servo zone; and
  determining that the head is approaching the servo zone boundary based at least in part on the first previous track identifier.

13. The disk drive of claim 12, wherein the computer-readable memory has further instructions stored thereon that are executable by the processor in order to cause the processor to:
  based at least in part on the prediction, place the read channel in a switching state, wherein a setting for at least one analog filter between the head and the servo demodulator is calibrated to the first servo zone and the frequency multiplier/divider circuitry is configured to multiply or divide the reference clock by a second factor different than the first factor to generate a second servo timing recovery clock based at least in part on a second servo frequency associated with the second servo zone.

14. The disk drive of claim 1, wherein the frequency multiplier/divider circuitry comprises digital circuitry including at least one rewritable register configured to receive at least one variable used to multiply or divide the reference clock from the voltage-controlled oscillator to generate the first servo timing recovery clock.

15. The disk drive of claim 1, wherein the frequency multiplier/divider circuitry comprises a plurality of multiplier/divider circuits associated with different factors and configured to generate different servo timing recovery clocks, and a switch configured to select among the plurality of multiplier/divider circuits.

16. The disk drive of claim 1, wherein the frequency multiplier/divider circuitry comprises at least one divider configured to divide the reference clock from the voltage-controlled oscillator to generate a substantially constant clock, and additional multiplier/divider circuits configured to receive the substantially constant clock and to multiply or divide the substantially constant clock to generate the first servo timing recovery clock.

17. A method of operating a disk drive having a disk including a plurality of servo zones of different servo frequencies, a head actuatable over the disk, and a read channel, the method comprising:

receiving a signal from the head indicative of at least a portion of a servo sector in a first servo zone;

determining a servo frequency associated with the servo sector;

receiving a reference clock from a voltage-controlled oscillator of the read channel;

multiplying or dividing the reference clock from the voltage-controlled oscillator by a first factor to generate a first servo timing recovery clock for the first servo zone of the plurality of servo zones of different servo frequencies, the first factor selected based at least in part on the determined servo frequency from the different servo frequencies; and demodulating the at least a portion of the servo sector using the first servo timing recovery clock.

18. The method of claim 17, wherein determining the servo frequency comprises executing instructions in a processor of the disk drive.

19. The method of claim 18, wherein determining the servo frequency further comprises:

receiving data indicative of a first previous track identifier associated with a second servo zone;

determining that the head is approaching a servo zone boundary between the second servo zone and the first servo zone based at least in part on the first previous track identifier; and upon determining that the head is approaching the servo zone boundary, retrieving data indicative of the servo frequency associated with the first servo zone.

20. The method of claim 19 wherein determining the servo frequency further comprises:

receiving data indicative of a seek velocity of the head;

wherein determining that the head is approaching the servo zone boundary is based at least in part on the seek velocity.

21. The method of claim 19, further comprising:

upon determining that the head is approaching the servo zone boundary, placing the read channel in a switching state, wherein a setting for at least one analog filter between the head and a servo demodulator is calibrated to the first servo zone and the reference clock from the voltage-controlled oscillator is multiplied or divided by a second factor different than the first factor to generate a second servo timing recovery clock based at least in part on a second servo frequency associated with the second servo zone.

22. The method of claim 21, wherein determining the servo frequency further comprises:

receiving data indicative of a second previous track identifier associated with the second servo zone, the data indicative of the second previous track identifier received after the data indicative of the first previous track identifier; and predicting that the head will cross the servo zone boundary before a subsequent servo wedge passes underneath the head based at least in part on the second previous track identifier.

23. The method of claim 22, wherein the reference clock from the voltage-controlled oscillator is multiplied or divided to generate the first servo timing recovery clock based at least in part on the prediction that the head will cross the servo zone boundary and on the servo frequency associated with the first servo zone.

24. The method of claim 17, wherein determining the servo frequency includes determining the servo frequency using circuitry within the read channel.

25. The method of claim 24, further comprising detecting when the head has crossed a servo zone boundary between a second servo zone and the first servo zone based on characteristics of a preamble of a first servo sector associated with the first servo zone.

26. The method of claim 25, further comprising, before detecting when the head has crossed the servo zone boundary, predicting that the head will cross the servo zone boundary by executing instructions in a processor of the disk drive.

27. The method of claim 26, wherein determining the servo frequency further comprises:

receiving data indicative of a first previous track identifier associated with a second servo zone; and determining that the head is approaching the servo zone boundary based at least in part on the first previous track identifier.

28. The method of claim 27, wherein determining the servo frequency further comprises:

receiving data indicative of a seek velocity of the head;

wherein determining that the head is approaching the servo zone boundary is based at least in part on the seek velocity.

29. The method of claim 27, further comprising:

upon determining that the head is approaching the servo zone boundary, placing the read channel in a switching state, wherein a setting for at least one analog filter between the head and a servo demodulator is calibrated to the first servo zone and the reference clock from the voltage-controlled oscillator is multiplied or divided by a second factor different than the first factor to generate a second servo timing recovery clock based at least in part on a second servo frequency associated with the second servo zone.

30. The method of claim 17, wherein multiplying or dividing the reference clock from the voltage-controlled oscillator further comprises setting at least one rewritable register with at least one variable used to multiply or divide the reference clock from the voltage-controlled oscillator to generate the first servo timing recovery clock.

31. The method of claim 17, wherein multiplying or dividing the reference clock from the voltage-controlled oscillator further comprises switching between a plurality of multiplier/divider circuits associated with different factors and configured to generate different servo timing recovery clocks.

32. The method of claim 17, further comprising dividing the reference clock from the voltage-controlled oscillator to generate a substantially constant clock, and wherein multiplying or dividing the reference clock from the voltage-controlled oscillator comprises multiplying or dividing the substantially constant clock to generate the first servo timing recovery clock.

33. A disk drive comprising:

a disk having a disk surface including:

a first servo zone associated with a first servo frequency; and a second servo zone associated with a second servo frequency different than the first servo frequency, the second servo zone including a first plurality of servo sectors, each of the first plurality of servo sectors including a preamble defined by a first plurality of bits, and at least one boundary servo sector, the at least one boundary servo sector located near the first servo zone and including an extended preamble defined by a second plurality of bits greater than the first plurality of bits; and a head actuatable over the disk surface, the head operable to read from and write to the disk surface.

\* \* \* \* \*